US012698091B2

(12) United States Patent
Edwards

(10) Patent No.: US 12,698,091 B2
(45) Date of Patent: Aug. 4, 2026

(54) AIRCRAFT FUEL STORAGE STRUCTURE

(71) Applicant: Airbus Operations Limited, Filton (GB)

(72) Inventor: Henry Edwards, Filton (GB)

(73) Assignee: Airbus Operations Limited, Filton Bristol (GB)

( * ) Notice: Subject to any disclaimer, the term of this patent is extended or adjusted under 35 U.S.C. 154(b) by 274 days.

(21) Appl. No.: 18/673,907

(22) Filed: May 24, 2024

(65) Prior Publication Data

US 2024/0391601 A1 Nov. 28, 2024

(30) Foreign Application Priority Data

May 26, 2023 (GB) ..................................... 2307966

(51) Int. Cl.
B64D 37/10 (2006.01)

(52) U.S. Cl.
CPC ..................................... B64D 37/10 (2013.01)

(58) Field of Classification Search
CPC ......... B64D 37/08; B64D 37/10; B64D 37/30
See application file for complete search history.

(56) References Cited

U.S. PATENT DOCUMENTS

| | | | | |
|---|---|---|---|---|
| 5,913,451 A | * | 6/1999 | Madison | .............. B60K 15/061 220/900 |
| 6,021,978 A | * | 2/2000 | Goss | ...................... B64D 37/32 244/135 B |

| | | | | |
|---|---|---|---|---|
| 8,770,156 B2 | * | 7/2014 | Theis | ................. F02M 37/0088 123/576 |
| 2009/0314783 A1 | * | 12/2009 | Losinski | ............... B64D 37/16 220/721 |
| 2010/0176135 A1 | | 7/2010 | Theis et al. | |
| 2014/0144917 A1 | * | 5/2014 | Meillat | .................. B64D 37/22 137/1 |
| 2015/0266589 A1 | * | 9/2015 | Blumer | ................. B64D 37/34 244/135 R |
| 2016/0009406 A1 | * | 1/2016 | Burnell | .................. B64D 37/10 244/135 R |
| 2017/0152056 A1 | | 6/2017 | James et al. | |

(Continued)

FOREIGN PATENT DOCUMENTS

| | | | | |
|---|---|---|---|---|
| EP | 2923948 A1 | | 9/2015 | |
| EP | 2965992 A1 | * | 1/2016 | ............. B64D 37/02 |

(Continued)

OTHER PUBLICATIONS

United Kingdom Search and Examination Report for corresponding United Kingdom Patent Application No. 2307966.8 dated Oct. 23, 2023.

*Primary Examiner* — Christopher P Ellis
(74) *Attorney, Agent, or Firm* — Greer, Burns & Crain, Ltd.

(57) ABSTRACT

A fuel storage structure for an aircraft. The fuel storage structure comprises a first container configured to store a first type of fuel and a second container arranged within the first container. The second container has a variable volume and is configured to store a second type of fuel. The fuels storage structure comprises a fuel release apparatus operable to provide the first type of fuel and the second type of fuel stored by the first container and the second container, respectively, to an engine of the aircraft.

22 Claims, 7 Drawing Sheets

(56)     References Cited

U.S. PATENT DOCUMENTS

| | | | |
|---|---|---|---|
| 2017/0283083 A1* | 10/2017 | Behbahani-Pour | A62C 3/08 |
| 2018/0093780 A1 | 4/2018 | Melton et al. | |
| 2019/0055030 A1* | 2/2019 | Haugstetter | B64D 37/06 |
| 2022/0081123 A1* | 3/2022 | Jomain | B64D 37/10 |
| 2024/0239510 A1* | 7/2024 | Gambioli | B64D 37/22 |
| 2025/0377109 A1* | 12/2025 | Lambourne | F02C 3/22 |

FOREIGN PATENT DOCUMENTS

| | | | | |
|---|---|---|---|---|
| EP | 3173339 A1 | | 5/2017 | |
| GB | 2544806 A | * | 5/2017 | B64D 37/20 |
| JP | H0840394 A | * | 2/1996 | |

* cited by examiner

Provide a first type of fuel to the first container

S101

Provide a second type of fuel to the second container

S103

Release the second type of fuel from the second container to the first container

S105

Provide at least one of the first type of fuel and the second type of fuel to the engine

S107

1, 1

100

AIRCRAFT FUEL STORAGE STRUCTURE

CROSS-REFERENCES TO RELATED APPLICATIONS

This application claims the benefit of Great Britain Patent Application Number 2307966.8 filed on May 26, 2023, the entire disclosure of which is incorporated herein by way of reference.

FIELD OF THE INVENTION

The present invention relates to aircraft fuel storage structures and systems, as well as methods for providing fuel to aircraft engines.

BACKGROUND OF THE INVENTION

It can be desirable for an aircraft to use multiple types of fuel as different types of fuel can be suitable at different stages of a flight. For example, during airport operations such as taxiing and gate-based operations, there may be an increased environmental benefit in using a sustainable aviation fuel, SAF, which may have a lower sulfur content and may produce less soot than regular fuel, such that impact on air quality on the ground is reduced. During descent, where engine cooling can be a challenge, a fuel which is more thermally stable than regular fuel may be preferable.

To store the types of fuel separately, external tanks can be used. However, these tanks can have a negative impact on the aerodynamic performance. Additional internal tanks, such as an auxiliary center tank or rear center tank, can be added to the fuselage, but these can come at the cost of reducing the available cargo volume.

It is therefore desirable to provide an improved fuel storage technology which can enable the storage and use of multiple types of fuel.

SUMMARY OF THE INVENTION

A first aspect of the present invention provides a fuel storage structure for an aircraft, wherein the fuel storage structure comprises a first container configured to store a first type of fuel, a second container arranged within the first container, wherein the second container has a variable volume and is configured to store a second type of fuel, and a fuel release apparatus operable to provide the first type of fuel and the second type of fuel stored by the first container and the second container, respectively, to an engine of the aircraft.

The fuel storage structure, having such a second container arranged with a first container, is able to store two types of fuel within a common volume, or in other words, within a volume of the first container. This can allow an aircraft to use multiple types of fuel, which, for example, can be used at different stages of a flight.

The second container, having a variable volume, can occupy a variable portion of the volume of the first container. This allows an amount of the first type of fuel and an amount of the second type of fuel to be changed according to various requirements of the aircraft. For example, in some cases, the volume of the second container could substantially fill the first container to increase storage of the second type of fuel. In other cases, the second container can be substantially empty and the volume of the second container reduced such that storage of the first type of fuel is increased.

The second container, having a variable volume, may be more easily installed into, as well as removed from, the first container, thereby facilitating maintenance of the second container. This can allow the second container to be retrofit into existing aircraft. This can also allow the second container to be used in a temporary fashion. Due to the relatively high cost of some types of fuel, it may be undesirable to have permanent storage arranged for some types of fuel, as the types of fuel may only be used on select journeys, for example, and the associated storage is otherwise wasted.

The fuel release apparatus may refer to parts of, or an entire infrastructure required to transport fuel from the respective containers all the way to the engine, for example pumps, conduits, valves, and control devices thereof. Optionally, the fuel release apparatus is operable to release the second type of fuel from the second container into the first container. This can allow a mix, or blend, of the first type of fuel and the second type of fuel in the first container, which can be provided to the engine.

In some examples where the fuel release apparatus is operable to release the second type of fuel from the second container to the first container, the fuel release apparatus comprises a valve operable to release the second type of fuel from the second container into the first container. This allows the second type of fuel to be selectively released into the first container while preventing the first type of fuel from entering the second container.

In some examples, the valve is an actuator-controlled valve. The actuator-controlled valve can be actively controlled to release the second type of fuel from the second container into the first container.

In some examples, the valve is a float valve operable to release the second type of fuel from the second container based on a volume of the first type of fuel and/or a volume of the second type of fuel stored in the first container. This can allow the release of the second type of fuel from the second container into the first container to be passively governed by the volume of fuel in the first container.

Optionally, the fuel release apparatus is operable to provide the second type of fuel from the second container to the engine of the aircraft independently from providing the first type of fuel from the first container to the engine of the aircraft. This can allow the engine to be provided with either the first type of fuel or the second type of fuel without the first type of fuel mixing, or blending with, the second type of fuel.

Optionally, the second container comprises at least a portion that is deformable to allow the volume of the second container to be varied. The deformable portion can allow the second container to change shape. By changing the shape, the second container can be more easily installed or removed from the first container via an access port of the first container.

In some examples, the deformable portion is configured to be foldable. The foldable nature of the deformable portion may allow the second container to have a first volume when in a constructed state and have a second, smaller volume when in a folded, or collapsed, state. The deformable portion may comprise substantially rigid parts which are connected by flexible joints or hinges. In some examples, the deformable portion, or the entire second container, may form a concertina or bellows structure.

In some examples, at least a part of the deformable portion may be elastic, allowing the deformable portion to have a variable surface area which can change depending on the volume of the second container. In some examples, such an elastic portion may expand or shrink depending on an amount of the second type of fuel currently stored by the second container. The elastic portion can passively impart a pressure on the second type of fuel stored within the second container due to an elasticity of the elastic portion, which can improve a flow rate of the second type of fuel out of the second container. In some examples, the pressure imparted by the elastic portion on the second type of fuel may be caused by pressure imparted upon the elastic portion by the first type of fuel stored within the first container. The elastic portion may act to reduce the volume of the second container when empty.

In some examples, the second container is a bladder. In some examples, the second container comprises a deformable portion such as a bladder, which optionally may be elastic.

Optionally, the second container is not fixedly attached to the first container. The second container may, for example, be able to float freely within the first container, or be flexibly tethered to the first container. This allows for the weight of the second container to be evenly distributed throughout the first container, thereby reducing forces exerted on particular portions of the first container and hence the risk of inadvertently damaging the first container during, for example, turbulence.

Optionally, the second container is at least partially mounted to an internal surface of the first container. This can prevent undesirable movement of the second container relative to the first container during, for example, turbulence, and can thereby prevent damage of the second container from being sustained.

Optionally, the first container forms a substantially rigid enclosure for the first type of fuel. Such a substantially rigid first container may also be referred to as a fuel tank. In examples where the first container is a fuel tank, the first container may be a fuselage or wing-mounted fuel tank.

Optionally, the first type of fuel is a hydrocarbon-based aviation fuel, and the second type of fuel is a non-fossil fuel derived sustainable aviation fuel, SAF. This can allow sustainable aviation fuel to be used selectively when desired.

A second aspect of the present invention provides an aircraft fuel storage system comprising a fuel storage structure for an aircraft. The fuel storage structure comprises a first container configured to store a first type of fuel and a second container arranged within the first container. The second container has a variable volume and is configured to store a second type of fuel. The fuel storage structure also comprises a fuel release apparatus operable to provide the first type of fuel and the second type of fuel stored by the first container and the second container, respectively, to an engine of the aircraft, and a controller operable to control an operation of the fuel release apparatus.

The fuel storage system according to the second aspect can provide similar advantages as described for the fuel storage structure of the first aspect.

The controller allows for the fuel release apparatus to be operated to selectively release the first type of fuel and the second type of fuel from the aircraft fuel storage structure to the engine according to, for example, a control scheme.

Optionally, the fuel release apparatus is operable to release the second type of fuel from the second container into the first container. This can allow the first type of fuel and the second type of fuel to be mixed, or in other words blended, in the first container, and provided to the engine.

Optionally, the controller is operable to control the operation of the fuel release apparatus based on flight information. This can allow the controller to determine release of a type of fuel to the engine based on information about the flight.

In examples, the flight information includes at least one of a current altitude of the aircraft, a current speed of the aircraft, or a current route information of the aircraft. This can allow the fuel release apparatus to provide a type of fuel most appropriate for a given altitude, speed, or current route information, for example.

Optionally, the controller is operable to control the operation of the fuel release apparatus based on an engine feed flow rate. This can allow fuel to be released based on the current fuel requirements of the engine, and further allow fuel to be released from the first and/or second container at a sufficient rate to maintain a target engine feed flow rate.

Optionally, the controller is operable to control the operation of the fuel release apparatus to provide a determined ratio of the first type of fuel and the second type of fuel to the engine. In some examples, this can allow the aircraft engine to receive a constant ratio of the first type of fuel to the second type of fuel over the duration of a flight. In other examples, the controller may allow the ratio of the first type of fuel to the second type of fuel to be modified over the duration of a flight. In further examples, the ratio is determined by flight information or engine feed flow rate.

According to a third aspect of the invention, there is provided a method of providing fuel to an engine of an aircraft, wherein the aircraft comprises a first container comprising a first type of fuel, and a second container arranged within the first container, wherein the second container has a variable volume and comprises a second type of fuel, and wherein the method comprises providing at least one of the first type of fuel and the second type of fuel to the engine.

Optionally, providing the second type of fuel to the engine comprises releasing the second type of fuel from the second container to the first container and providing the second type of fuel to the engine from the first container.

Optionally, the first type of fuel is regular aviation fuel, and the second type of fuel is sustainable aviation fuel, SAF.

Features and advantages described for any particular aspect of the invention may be equally applied to other aspects of the invention where appropriate.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1A:
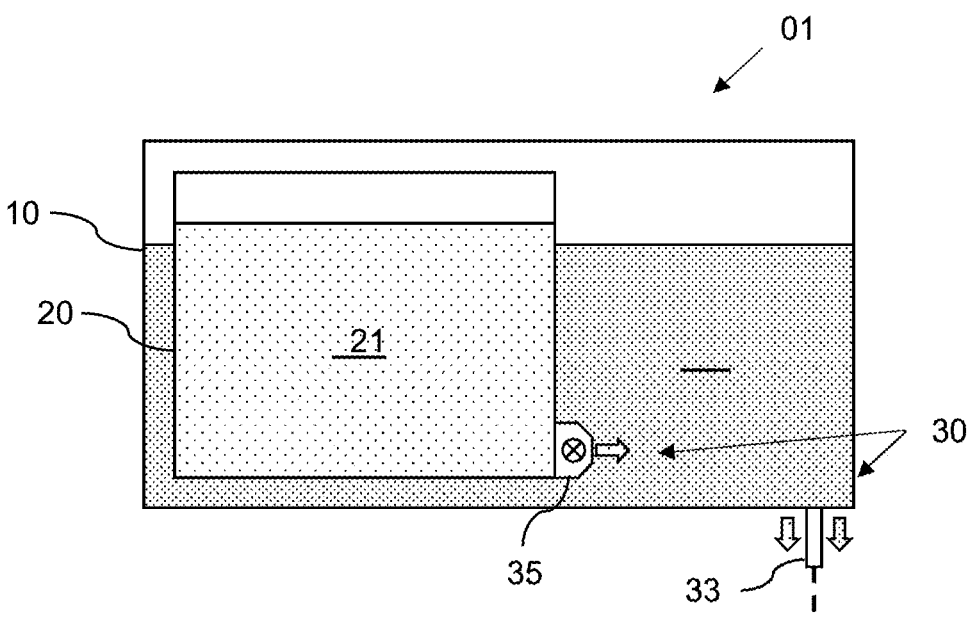
FIG. 1*a* shows schematic views of a fuel storage structure according to an embodiment of the present invention.
Figure 1B:
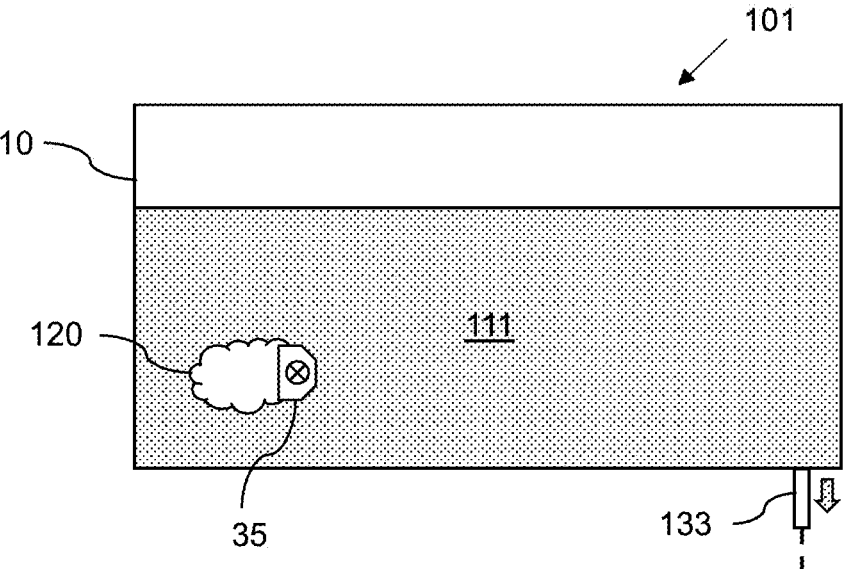
FIG. 1*b* shows schematic views of a fuel storage structure according to an embodiment of the present invention.

FIGS. 1a and 1b illustrate schematically a fuel storage structure 101 for an aircraft according to some embodiments. In FIG. 1a, the fuel storage structure 101 comprises a first container 110 which is configured to store a first type of fuel 111, and a second container 120 which is configured to store a second type of fuel 121. The second container 120 is arranged within the first container 110 such that the first container 110 can be considered to house the second container 120. In other words, the second container 120 is located inside the first container 110 and surrounded by internal walls of the first container 110. In this way, the first type of fuel 111 and the second type of fuel 121 are stored within a common volume, that is, the volume within the first container 110. The first type of fuel 111 is isolated from the second type of fuel 121 when the second type of fuel 121 is stored in the second container 120.

In the present example, the first container 110 is a fuel tank located in the wing of the aircraft (not pictured). The first container 110 is a substantially rigid enclosure for the first type of fuel 111, whereby substantially rigid means that the majority or the entirety of the first container 110 walls are rigid such that the external and internal structure of the first container undergoes minimal change in shape during regular use.

The second container 120 may be a fuel bladder formed of, for example, fluorosilicone. Beneficially, the fuel bladder may be deformable, allowing the volume of the second container 120 to be varied with the amount of the second type of fuel 121 currently stored within the second container 120. In FIG. 1a, the second container 120 is storing the second type of fuel 121 and can be considered to be in an enlarged state. In FIG. 1b, the second container 120 is empty and can thus be considered to be in a collapsed state. As shown in FIG. 1b, in which the second container 120 is empty and arranged in a collapsed state, the first container 110 can store a greater volume of the first type of fuel 111 than compared with if the second container 120 did not have a variable volume. In this way, even if the second container 120 is permanently disposed within the first container 110, storage capabilities of the first container, such as the total volume of fuel storable by the first container 110, are not impacted, or are impacted less severely, than compared with a second container having a fixed volume.

In some examples, the fuel bladder may comprise a venting system in order to manage and prevent an overpressure condition.

In the example of FIG. 1a, the second container 120 is substantially unattached to the first container 110 such that the second container 120 is arranged to float freely within the first container 110. Substantially unattached means that the second container 120 is allowed to move relative to the first container 110. In this example, no surfaces of the second container 120 are attached directly or indirectly to internal walls of the first container 110. In other examples, the second container 120 may be tethered, for example by a wire to an anchoring point within the first container 110, but otherwise unattached to the first container 110 and free to move around within the first container 110. The second container 120 being substantially unattached to the first container 110 may allow the second container 120 to be installed into the first container 110 without any modification to the internal structure of the first container 110. This can improve flexibility and facilitate installation and retrofitting, for example.

The fuel storage structure 101 may comprise a fuel release apparatus 130 which is operable to provide the first type of fuel 111 and the second type of fuel 121 to the engine of the aircraft. In the example shown in FIGS. 1a and b, the fuel release apparatus comprises a valve 135 and an engine feed line 133. The valve 135 and the engine feed line 133 can each be employed to regulate the amount of the first type of fuel 111 and the second type of fuel 121 supplied to the engine of the aircraft.

The valve 135 in FIGS. 1a and 1b is arranged within the second container 120, such that the valve 135 can regulate release of the second type of fuel 121 from the second container 120 into the first container 110. In the example of FIG. 1b, the valve 135 is an actuator-controlled valve which can be remotely instructed to release the second type of fuel 121 from the second container 120 into the first container 110. In this way, a mix, or blend, of the first type of fuel 111 and the second type of fuel 121 can be produced, or prepared, in the first container 110.

In other examples, the valve 135 can be a float-valve configured to passively measure a volume of fuel stored within the first container 110 and accordingly release the second type of fuel 121 from the second container 120 based on this volume. This allows for passive control of the fuel without requiring active control. A float valve can be arranged to release the second type of fuel 121 from the second container 120 once the first type of fuel in the first container 110 has been depleted, or has reached a predetermined amount, for example half full or a quarter full.

In examples wherein the second container 120 is deformable, a pressure of the first type of fuel 111, or the mix of the first type of fuel 111 and the second type of fuel 121 in the first container 110, can be transmitted to the second type of fuel 121 stored within the second container 120. The pressure of the first type of fuel 111 can hence facilitate release of the second type of fuel 121 into the engine feed line 133. Equalizing the pressure of the first type of fuel 111 and the second type of fuel 121 by allowing pressure to be transmitted can improve fuel release through the valve, for example, by preventing or reducing a pressure gradient against the second type of fuel 121.

The engine feed line 133 may be configured to transport fuel from the first container 110 to the engine. The engine feed line 133 may interface with a fuel distribution network of the aircraft. When the first container 110 is only storing the first type of fuel 111, and the second container 120 is either empty (such as in FIG. 1b) or has not released the second type of fuel 121 into the first container 110, the engine feed line 133 may provide the first type of fuel 111 to the engine. When the second container 120 has released some of the second type of fuel 121 into the first container 110, such that a mix of the first type of fuel and the second type of fuel 121 is stored by the first container 110, the engine feed line 133 may provide the mix of the first type of fuel 111 and the second type of fuel 121 from the first container 110 to the engine.

In the example of FIG. 1a, the first type of fuel is regular aviation fuel, and the second type of fuel is a sustainable aviation fuel. Regular aviation fuel as described here relates to e.g. hydrocarbon-based fuels such as kerosene-based fuels which are typically used to power aircraft. Regular aviation fuel will be understood by the skilled person to be, for example, Jet A or Jet A1 fuels. The skilled person will appreciate that sustainable aviation fuel, SAF, is a term referring to fuels derived in a more sustainable manner, such as from non-fossil sources. Such sustainable aviation fuels can mitigate contrail formation or improve air quality around airports, for example.

Figure 2A:
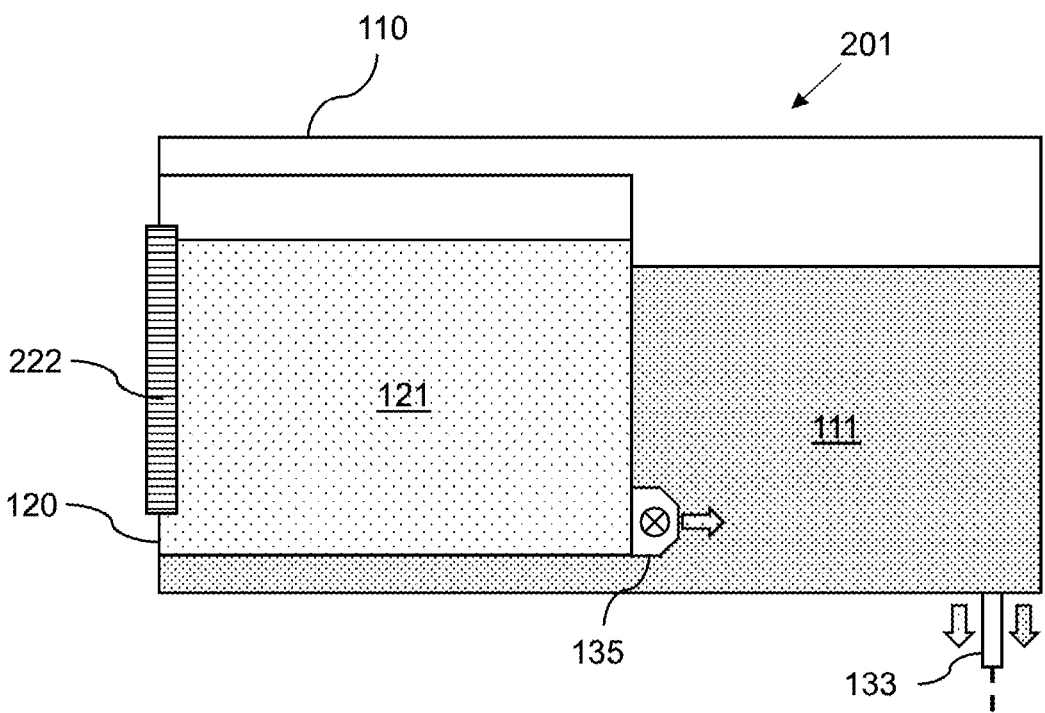
FIG. 2*a* shows schematic views of a fuel storage structure according to an embodiment of the present invention.
Figure 2B:
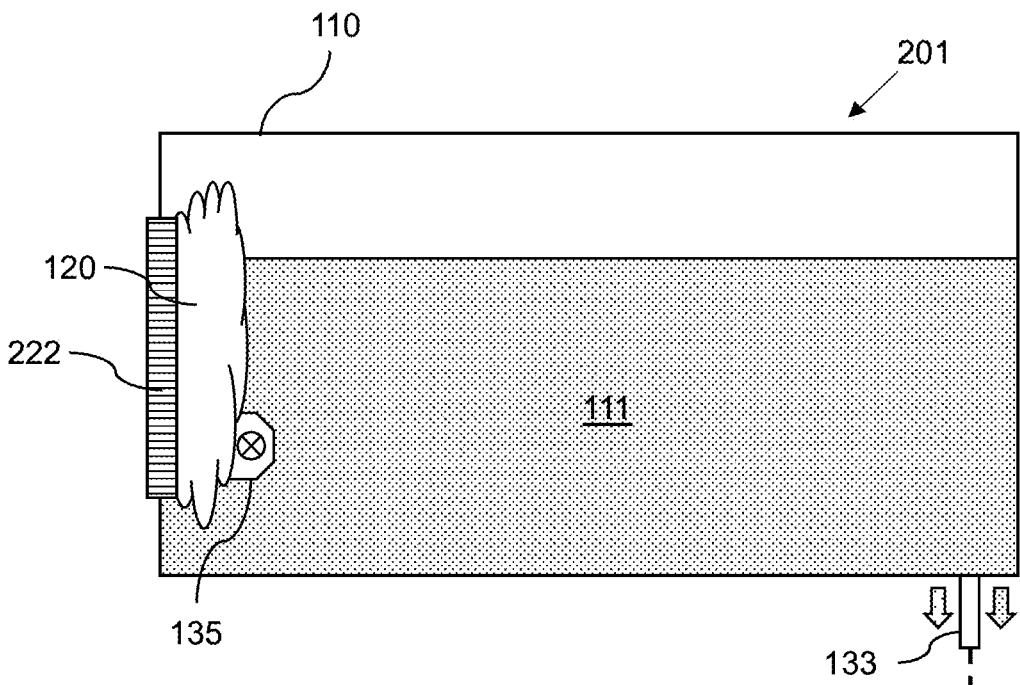
FIG. 2*b* shows schematic views of a fuel storage structure according to an embodiment of the present invention.

FIGS. 2a and 2b illustrate schematically a fuel storage structure 201 according to some examples. Similarly to the examples of FIGS. 1a and 1b, in FIG. 2a, the fuel storage structure 201 comprises a first container 110 which is configured to store a first type of fuel 111, and a second container 120 which is configured to store a second type of fuel 121. The second container 120 is arranged within the first container 110.

In the examples of FIGS. 1a and 1b, the second container 120 is substantially unattached to the first container 110. In the examples of FIGS. 2a and b, a portion of the second container 120 is mounted to an internal wall of the first container 110, for example by means of a connector 222. The connector 222 in this example is a detachable fastener which is arranged between an internal wall of the first container 110 and the second container 120, and so the second container 120 can be attached and detached from the internal wall of the first container 110. In other examples, the second container 120 may be permanently attached to the first container 110. For example, the second container 120 may be permanently attached to the internal wall of the first container 110 by adhesive or fasteners. In other examples, the second container 120 may be additionally attached to the surrounding first container 110 by additional clips or bracketry, for example, to further secure the second container 120.

The second container 120 illustrated in FIGS. 2a and 2b is therefore restricted from moving around within the first container 110. As a result, the second container may remain relatively fixed in position during for example turbulence, thereby reducing the risk of inflicting damage to either itself or the first container. In FIG. 2b, the second container 120 is substantially empty and arranged in a collapsed state. In the collapsed state, the second container 120 may be retained against the internal wall by the connector 222 so as to not, for example, block the engine feed line 133.

Figure 3:
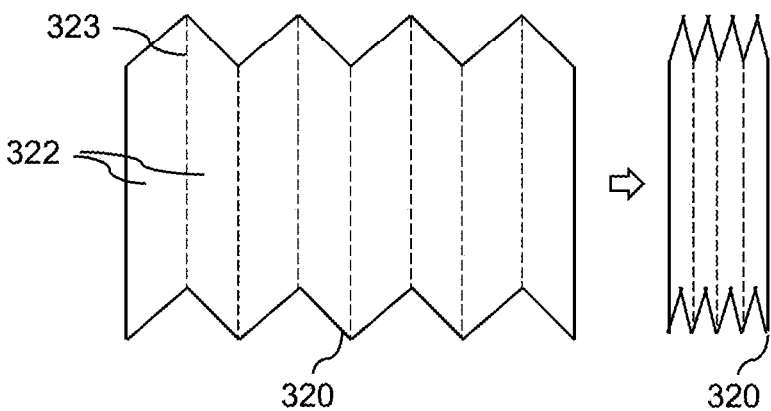
FIG. 3 shows a schematic view of a second container according to an embodiment of the present invention.

FIG. 3 illustrates schematically a further example of a second container 320. In the examples of FIGS. 1a and 1b, as well as 2a and 2b, the second containers 120 are bladders. In the example of FIG. 3, the second container 320 comprises a concertina shaped structure, or bellows structure. Rigid parts 322 are connected at flexible joints 323 such that the second container 320 can be considered to be foldable. The foldable concertina shaped structure allows for the volume of the second container 320 to be variable. Further, the rigid parts 322 may allow for the second container 320 to be more structurally robust against impact, thereby improving the safety of the fuel storage structure 101, 201.

Figure 4:
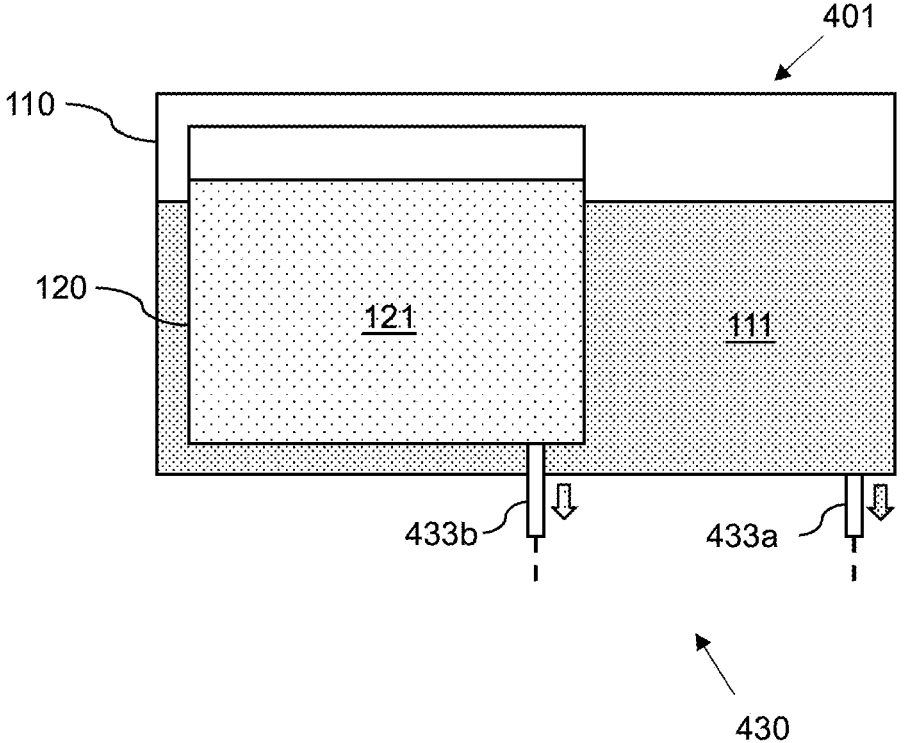
FIG. 4 shows a schematic view of a fuel storage structure according to an embodiment of the present invention.

FIG. 4 illustrates schematically an example of a fuel storage structure 401 according to an example. Similarly to FIGS. 1a and 2b, the fuel storage structure 101 comprises a first container 110 which is configured to store a first type of fuel 111, and a second container 120 which is configured to store a second type of fuel 121. The second container 120 is arranged within the first container 110.

In the example of FIG. 4, the fuel release apparatus 430 comprises a first engine feed line 433a and a second engine feed line 433b. The first engine feed line 433a may be is similar to the engine feed line 133 illustrated in FIGS. 1a and 1b and 2a and 2b and arranged to provide fuel stored within the first container 110 to the engine. The second engine feed line 433b is directly connected to the second container 120 and configured to provide the second type of fuel 121 from the second container 120 to the engine, without providing the first type of fuel 111 to the engine. In this way, the fuel release apparatus 430 can provide the second type of fuel 121 from the second container 120 to the engine independently from providing the first type of fuel 111 from the first container 110 to the engine. This can be useful in examples where the second type of fuel 121 is a sustainable aviation fuel, as using such a sustainable aviation fuel without blending with regular aviation fuel may enhance environmental benefits of the sustainable aviation fuel.

Figure 5:
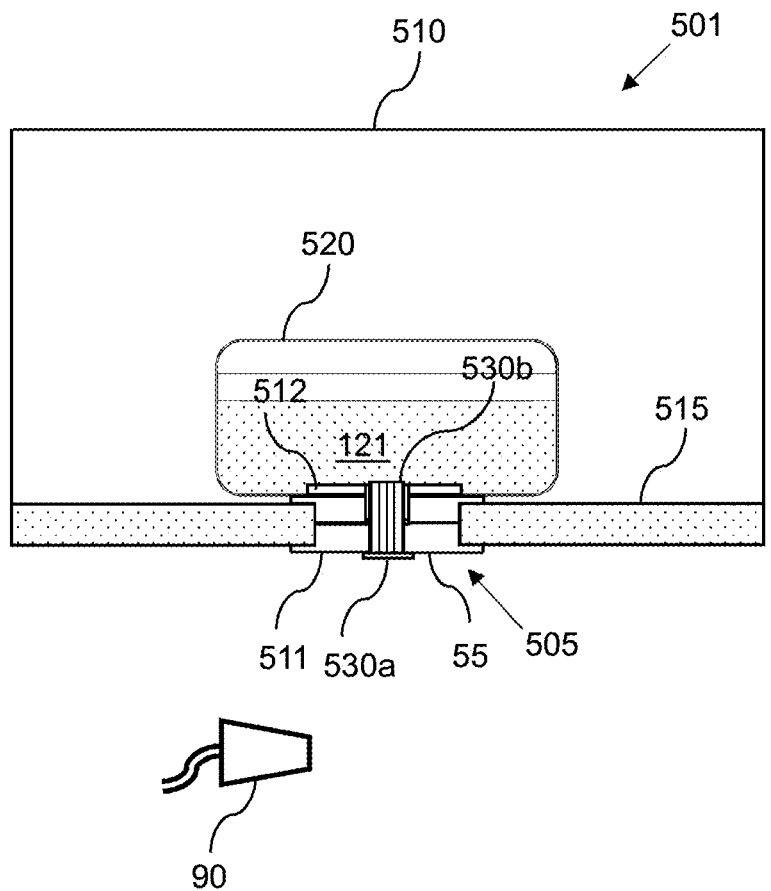
FIG. 5 shows a schematic view of a fuel storage structure according to an embodiment of the present invention.

FIG. 5 illustrates schematically a fuel storage structure 501 according to an example. The fuel storage structure 501 of FIG. 5 is substantially similar to the fuel storage structures described in previous examples, comprising a first container 510 and a second container 520 housed within the first container. Differences from the previous examples will now be described.

In the fuel storage structure 501 of FIG. 5, the first container 510 comprises an access port 505. The access port 505 is configured to allow a human operator to access an interior of the first container 510 of the fuel storage structure 501. As the skilled person will appreciate, access ports such as the access port 505 in the present example are typically provided to allow a human operator to access internal structures of the aircraft to perform maintenance, for example. Accordingly, access ports are typically designed to be secure and safe for an operator to enter and exit, and provide sufficient space for the operator to perform maintenance work. An access port can provide direct access into an interior of a fuel container. That is, an access port can be distinguished from other ports, which might be located in the vicinity of a fuel storage structure, but which do not provide a human operator with access to the interior of a fuel container, for example. In some cases, an access port cover comprises equipment used to monitor or interact with the interior of the fuel container, such as overpressure protectors. The access port 505 may alternatively be described as a manhole.

A cover 55 covers the access port 505. FIG. 5 illustrates a cross-sectional view of the structure of cover 55 and the first container 510. In this example, the cover 55 comprises a first panel 511 and a second panel 512. The first panel 511 and the second panel 512 are attachable to each other and, when attached, such that a surface portion of the fuel storage structure 501, in this example a surface 515 of the first container 510, is clamped therebetween. This can be referred to as a clamping configuration of the cover 55. The cover 55, when arranged to cover the access port 505, seals the access port 505 and hence the first container 510 of the fuel storage structure 501. In other examples, the cover 55 may comprise a single-panel construction such that the cover 55 is directly fastened to the surface 115 via bolts, for example, rather than clamping the surface 515.

The cover 55 comprises an inlet port 530a and an outlet port 530b. When the cover 55 is arranged to cover the access port 505, the outlet port 530b faces the interior of the first container 110, and the inlet port 530a faces externally to the first container 510. The inlet port 530a and outlet port 530b together function as a refueling interface. Aircraft refueling apparatus 90 can provide fuel, for example the second type of fuel 121, at the inlet port 30a which then flows to the outlet port 530b.

The second container 520 is attached to the cover 55 such that the second container 520 can receive fuel from the outlet port 530b. In this example, the second container 520 is specifically attached to the second panel 512. The second container 520 can be refueled from the inlet port 530a and outlet port 530b of the cover 55, and as such can be refueled separately from the first container 510. The first container 510 can instead be refueled by a primary refueling interface of the aircraft. Providing for independent refueling interfaces can reduce a risk of operator error, for example in providing an incorrect type of fuel to a particular fuel storage structure. The second container 520 can comprise the fuel release apparatus as described for previous examples, such as engine feed lines and/or valves, for example.

The second container 520 can be installed into the fuel storage structure 501 by being inserted through the access port 505. The access port 505 can thereafter be sealed with the cover 55, via which the second container 520 can be refueled. This can allow the second container 520 to be retrofitted into existing aircraft comprising fuel storage structures with access ports.

Figure 6:
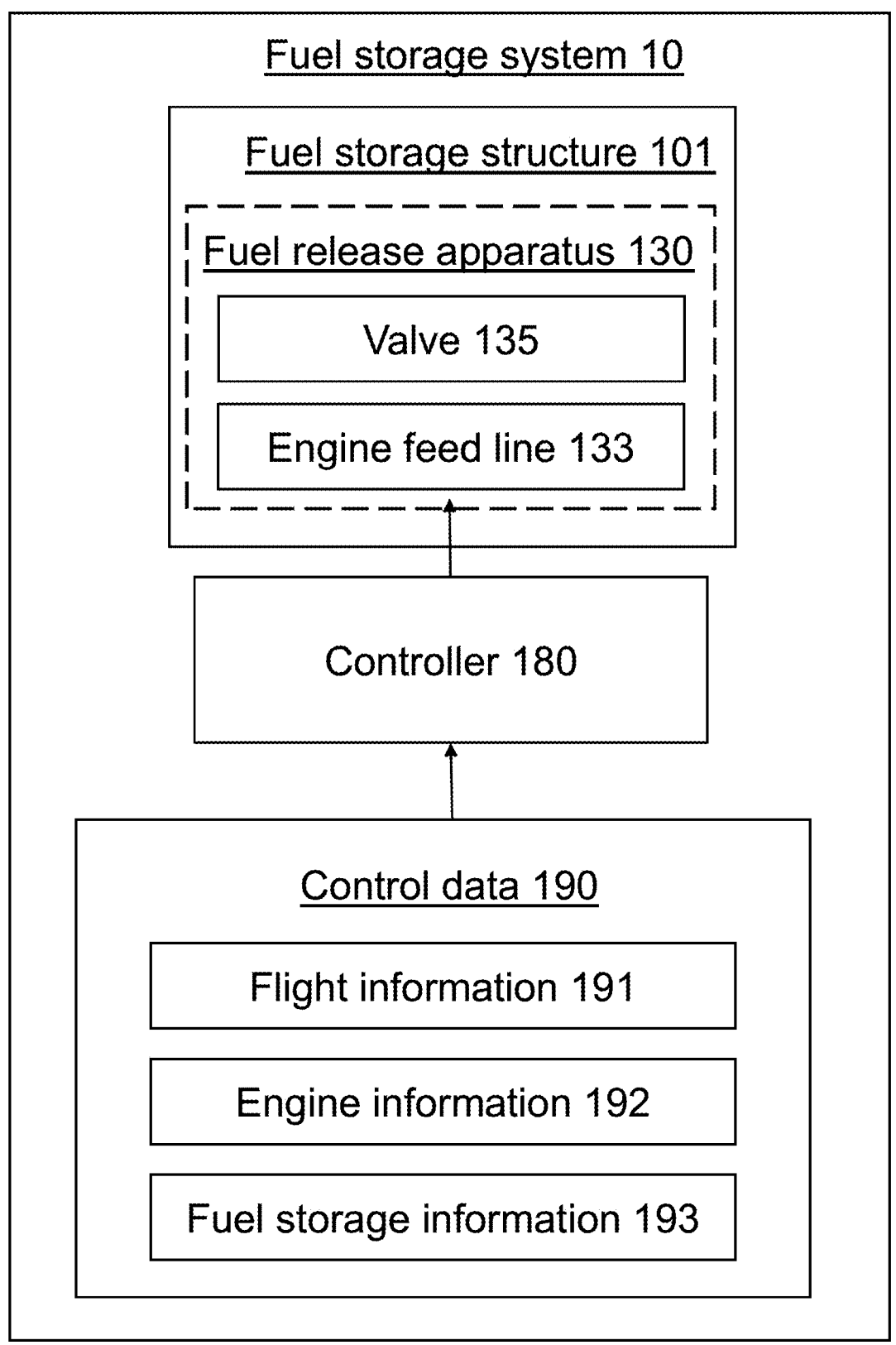
FIG. 6 shows a schematic view of a fuel storage system according to an embodiment of the present invention.

FIG. 6 illustrates schematically a fuel storage system 10 according to an example. In this example, the fuel storage system 10 comprises the fuel storage structure 101 described for FIGS. 1a and b. Additionally, the fuel storage system 10 comprises a controller 180, which is operably connected to the fuel release apparatus 130 of the fuel storage structure 101 and configured to control the operation of the fuel release apparatus 130. In this way, the fuel release apparatus 130 can provide the first type of fuel 111 and the second type of fuel 121 stored by the container 110 and the second container 120, respectively, to the engine of the aircraft.

The controller 180 is configured to be receive control data 190. Control data 190 in this example comprises flight information 191, engine information 192 and fuel storage information 193.

Flight information 191 may be understood as information relating to the flight. Examples of flight information include, but is not limited to, the current altitude of the aircraft, the current speed of the aircraft, and current route information of the aircraft. The current altitude can be used to determine an efficiency of a type of fuel, for example due to the availability of oxygen at the current altitude. The efficiency may be a measure of the distance travelled by the aircraft for a given volume of fuel, for example. It may be advantageous, therefore, to use a type of fuel with a higher efficiency based on the current altitude. Similarly, the current speed can be used to determine an efficiency of a type of fuel, and it may be advantageous to select a type of fuel based on the current speed of the aircraft. Examples of current route information may include an indication of how far through a planned route the aircraft currently is or a remaining travel distance. The flight information 191 may also comprise information on whether there are particular environmental restrictions for the current position of the aircraft. In general, flight information 191 may be used by the controller 180 to determine the operation of the fuel release apparatus 130, such that the first type of fuel 111 and the second type of fuel 121 are released to the engine at least partially according to information regarding the flight. Of course, the constituent flight information data may be used in conjunction with one another according to a predetermined control algorithm, for example, such that the controller 180 determines operation of the fuel release apparatus based on a combination of the current altitude and current speed. Flight information can be provided to the controller 180 by sensors, such as altitude sensors, ground speed sensors, and global positioning system (GPS) sensors.

Engine information 192 may be understood as information pertaining to the engine. In this example, the engine information 192 may comprise information describing the engine feed flow rate, which details the rate of fuel flow into the engine, and emissions information, which details information about emissions from the aircraft engine. The engine feed flow rate can be used by the controller 180 to, for example, increase or decrease the rate of release of the first type of fuel 111 or the second type of fuel 121 from the fuel storage structure 101 in order to achieve a target engine feed flow rate, for example. This information can be gathered by flow rate sensors. Similarly, the emissions information may describe the current emissions of the aircraft. When the emissions of the aircraft engine are below a target quality, the controller 180 can instruct the fuel release apparatus 130 to release the second type of fuel 121 in order to improve the emissions.

Fuel storage information 193 may refer to information associated with the fuel storage structure 101. In this example, the fuel storage information 193 comprises data indicating the current ratio of the first type of fuel 111 to the second type of fuel 121 currently stored in the first container 110. The fuel storage information 193 may also comprise a volume of the second type of fuel 121 remaining in the second container 120. This can be used by the controller 180 to control the valve 135 to release the second type of fuel 121 from the second container 120 to the first container 110 in order to achieve a desired ratio of the first type of fuel 111 to the second type of fuel 121 in the first container 110. Similarly, an indication that there is a low remaining amount of second type of fuel 121 in the second container 120 may indicate that the second type of fuel 121 should be spared, resulting in the fuel release apparatus 130 preventing the second type of fuel 121 from being released from the second container 120. A desired ratio may relate to a minimum concentration of the second type of fuel in the first type of fuel, for example.

Figure 7:
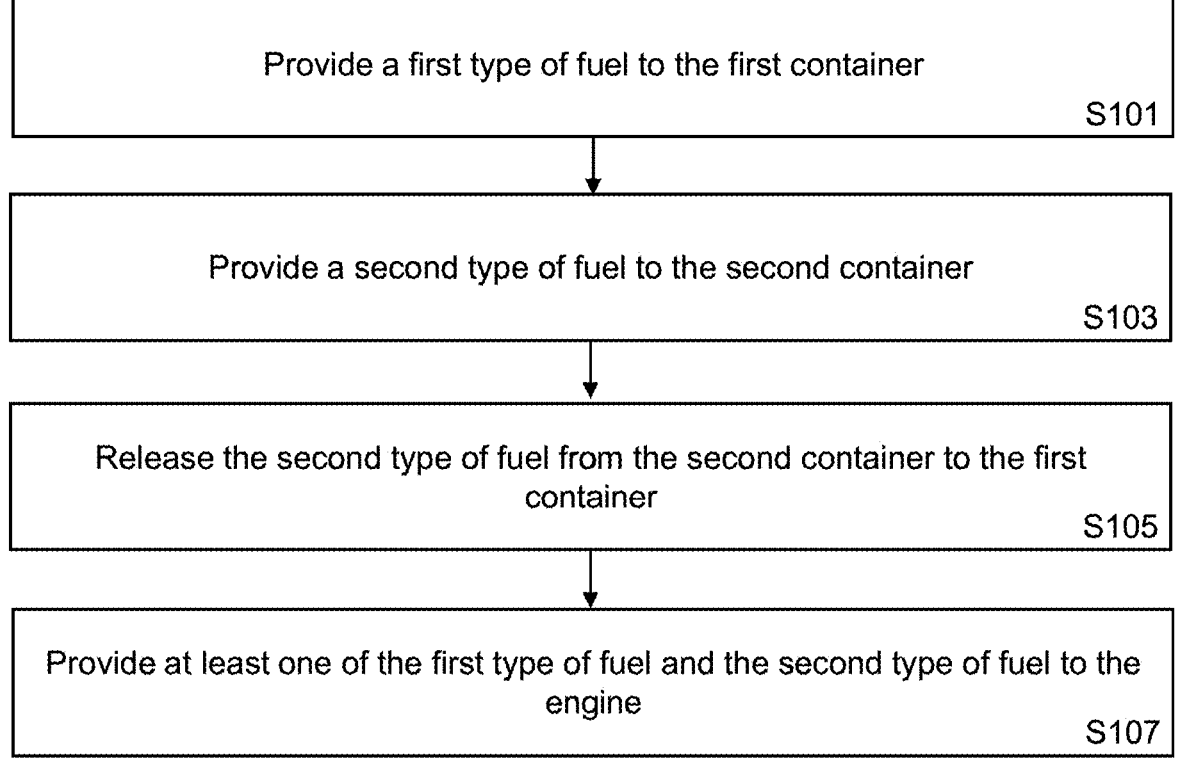
FIG. 7 shows a flow diagram illustrating the process of providing fuel from a fuel storage system according to some embodiments of the present invention; and, FIG. 8 shows a schematic view of an aircraft comprising a fuel storage system and structure according to some embodiments of the present invention.

FIG. 7 is a flow diagram depicting a process for providing fuel to an engine of an aircraft. The aircraft comprises a fuel storage structure according to examples described above in connection with the previous figures; that is, the fuel storage structure comprises a first container comprising a first type of fuel, and a second container arranged within the first container, the second container having a variable volume and comprising a second type of fuel.

At block S101, the first type of fuel is provided to the first container. Refueling of the first container may be performed by a first aircraft refueling apparatus. Block S101 can be considered a preparatory stage, and in some examples the first container will already comprise the first type of fuel. In this example, the first type of fuel is regular aviation fuel.

At block S103, the second type of fuel is provided to the second container. Refueling of the second container may be performed by a second aircraft refueling apparatus. Block S103 can be considered a preparatory stage, and in some examples the second container will already comprise the second type of fuel. Blocks S101 and S103 can, in some examples, occur concurrently with one another such that the first container is filled with the first type of fuel at the same time as the second container is filled with the second type of fuel. In other examples, Block S103 can occur before S101 such that the second container is filled with the second type of fuel before the first container is filled with the first type of fuel.

At block S105, the second type of fuel is released from the second container into the first container. As described previously, this can produce a blend of fuels which may be advantageous to provide to the engine. Block S105 is an optional stage, as in some examples the first type of fuel may not be mixed with the second type of fuel within the first container.

At block S107, at least one of the first type of fuel and the second type of fuel are provided to the engine. In some examples, this can include providing both types of fuel directly from their respective containers without mixing the fuel within the first container. In other examples, the second type of fuel is released into the first container and mixed with the first type of fuel. The blended mix of the first type of the fuel and the second type of fuel is then provided to the engine. In yet further examples, only the first type of fuel or the second type of fuel is provided to the engine at a given time.

Figure 8:
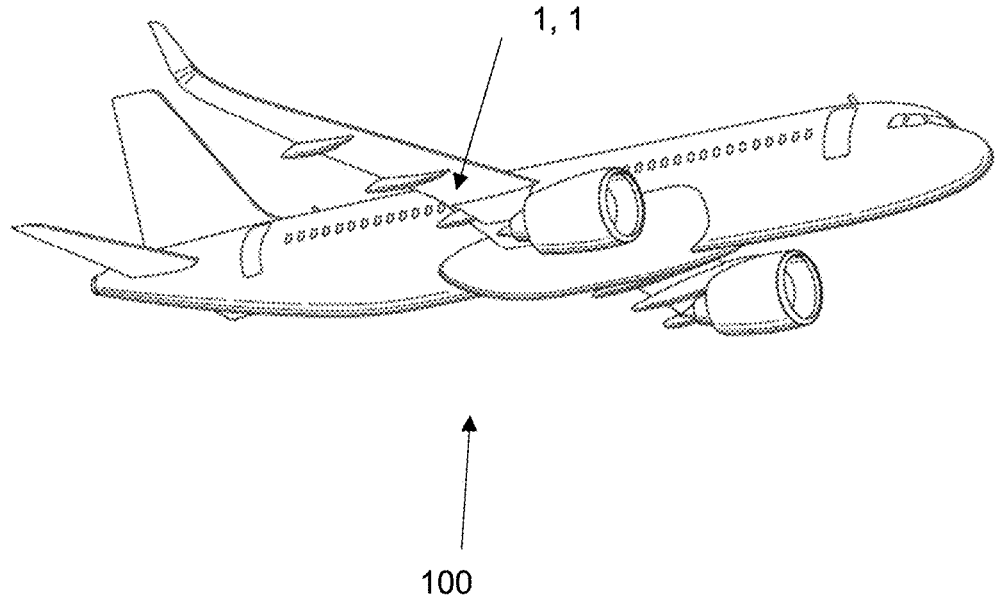

FIG. 8 illustrates schematically an aircraft 1000 comprising the fuel storage system 10 and constituent fuel storage structure 101, according to an example. The fuel storage system 10 and fuel storage structure 101 is located in a wing structure of the aircraft 1000. That is, the first container 110 of the fuel storage structure 101 is a wing fuel tank. The aircraft 1000 can thereby store a first type of fuel 111 in the first container 110 and a second type of fuel 121 in the second container 120 of the fuel storage structure 101, and utilize the first type of fuel 111 and the second type of fuel 121 as required during a flight. Due to the variable volume of the second container 120, the aircraft 1000 can carry as much or as little of the second type of fuel 121 as desired. When the second type of fuel 121 is not required for a particular flight, the second container 120 can be collapsed and the first type of fuel 111 can be stored in the first container 110 instead, utilizing the storage space freed up by the collapsed second container 120.

In the example of FIG. 8, the second container 120 has been retrofit into existing wing fuel tank storage structures of the aircraft 1000. This is possible because the second container 120, having a variable volume and being deformable, is installed within the existing wing fuel tank storage structures. The fuel storage system 10 and fuel storage structure 101 can therefore be conveniently installed to an aircraft after initial construction of the aircraft, further enhancing utility of the fuel storage system 10 and fuel storage structure 100. Similarly, by being deformable and having variable volume, maintenance can be performed by removing the system 10 and/or structure 100. In some examples, a replacement system or structure may be substituted whilst the removed system or structure undergoes maintenance such that the aircraft can continue to operate, which can reduce downtime of the aircraft.

The above embodiments are to be understood as an illustrative example of the invention. Further embodiments of the invention are envisaged:

In the above examples, the second container increases in volume as it is filled with the second type of fuel and decreases in volume as the second type of fuel is released either to the engine via the engine feed line or into the first container via the valve. In other examples, the second container could be increased in volume independently of whether it was currently storing fuel, for example as part of an installation process. The second container could therefore have a relatively fixed volume during a flight, and the variable volume used during installation and deinstallation processes.

In the above examples, a second container housed by a first container is described. In other examples there may be multiple containers housed by the first container. For example, a second container comprising a second type of fuel and a third container comprising a third type of fuel may be housed by the first container. In other examples, such a second container and a third container may store the same type of fuel. In yet further examples, the second container itself may house the third container, such that the containers are arranged in a nested configuration. In such examples, each container stored within the first container may comprise respective valves to perform functions similar to that of the valve 135 described above. In such examples, each container stored within the first container may also comprise separate engine feed lines to perform functions similar to that of the engine feed lines 133, 433a, b described above.

In the above examples, the second container is formed of fluorosilicone. In some examples, the material of the second container could be reinforced with Kevlar which can be compatible with aircraft fuels. Such reinforcement can improve the durability of the second container and thereby improve safety of the fuel storage structure. In other examples, the second container may be formed of nitrile.

In the example of FIG. 4, the fuel release apparatus 430 does not comprise a valve arranged at the second container 120 to release the second type of fuel 121 into the first container 110. In other examples, the fuel release apparatus may comprise a valve, arranged at the second container, as well as independent engine feed lines. In this way, the first type of fuel and second type of fuel can be provided to the engine in combination or separately, by controlling whether the second type of fuel is released by the valve into the first container, or provided to the engine directly by the respective engine feed line.

In the above examples, the second container is described as carrying a second type of fuel. In other examples, the second container could be configured to store any fluid for which it is desirable to store separately within the confines of an existing fuel tank boundary for safety or certification reasons, for example. The second container may be configured to store fuel additives, for example. In other examples, the second container may be configured to store biocide or water emulsifier.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

It is to be understood that any feature described in relation to any one embodiment may be used alone, or in combination with other features described, and may also be used in combination with one or more features of any other of the embodiments, or any combination of any other embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel storage structure for an aircraft, the fuel storage structure comprising:
a first container configured to store a first type of fuel, a second container arranged within the first container, the second container having a variable volume and being configured to store a second type of fuel, and
a fuel release apparatus configured to provide the first type of fuel and the second type of fuel stored by the first container and the second container, respectively, to an engine of the aircraft.

2. The fuel storage system of claim 1, wherein the fuel release apparatus is operable to release the second type of fuel from the second container into the first container.

3. The fuel storage structure of claim 2, wherein the fuel release apparatus comprises a valve configured to release the second type of fuel from the second container into the first container.

4. The fuel storage structure of claim 3, wherein the valve is an actuator-controlled valve.

5. The fuel storage structure of claim 3, wherein the valve is a float valve configured to release the second type of fuel from the second container based on a volume of the first type of fuel, or a volume of the second type of fuel stored in the first container, or both.

6. The fuel storage structure of claim 1, wherein the fuel release apparatus is configured to provide the second type of fuel from the second container to the engine of the aircraft independently from providing the first type of fuel from the first container to the engine of the aircraft.

7. The fuel storage structure of claim 1, wherein the second container comprises a deformable portion configured to vary a volume of the second container.

8. The fuel storage structure of claim 7, wherein the deformable portion is configured to be foldable.

9. The fuel storage structure of claim 7, wherein the deformable portion is elastic.

10. The fuel storage structure of claim 7, wherein the second container is a bladder.

11. The fuel storage structure of claim 1, wherein the second container is substantially unattached to the first container.

12. The fuel storage structure of claim 1, wherein the second container is at least partially mounted to an internal surface of the first container.

13. The fuel storage structure of claim 1, wherein the first container is a fuel tank forming a substantially rigid enclosure for the first type of fuel.

14. The fuel storage structure of claim 1, wherein the second container is made from reinforced fluorosilicone.

15. An aircraft fuel storage system comprising:
a fuel storage structure for an aircraft, the fuel storage structure comprising:
a first container configured to store a first type of fuel,
a second container arranged within the first container, the second container having a variable volume and being configured to store a second type of fuel, and
a fuel release apparatus configured to provide the first type of fuel and the second type of fuel stored by the first container and the second container, respectively, to an engine of the aircraft; and,
a controller configured to control an operation of the fuel release apparatus.

16. The aircraft fuel storage system of claim 15, wherein the fuel release apparatus is configured to release the second type of fuel from the second container into the first container.

17. The aircraft fuel storage system of claim 15, wherein the controller is configured to control the operation of the fuel release apparatus based on flight information.

18. The aircraft fuel storage system of claim 17, wherein the flight information includes at least one of: a current altitude of an aircraft, a current speed of the aircraft, or a current route information of the aircraft.

19. The aircraft fuel storage system of claim 15, wherein the controller is configured to control the operation of the fuel release apparatus based on an engine feed flow rate.

20. The aircraft fuel storage system of claim 15, wherein the controller is configured to control the operation of the fuel release apparatus to provide a determined ratio of the first type of fuel and the second type of fuel to the engine.

21. A method of providing fuel to an engine of an aircraft, the aircraft comprising a first container comprising a first type of fuel, and a second container arranged within the first container, the second container having a variable volume and comprising a second type of fuel, wherein the method comprises:

provide at least one of the first type of fuel and the second type of fuel to the engine.

22. The method of claim 21, wherein providing the second type of fuel to the engine comprises releasing the second type of fuel from the second container to the first container and providing the second type of fuel to the engine from the first container.

\* \* \* \* \*